United States Patent [19]
Lebby et al.

[11] Patent Number: 5,546,413
[45] Date of Patent: Aug. 13, 1996

[54] INTEGRATED LIGHT EMITTING DEVICE

[75] Inventors: Michael S. Lebby, Apache Junction; Christopher K. Y. Chun, Gilbert; Gary F. Witting, Scottsdale, all of Ariz.

[73] Assignee: Motorola, Schaumburg, Ill.

[21] Appl. No.: 299,877

[22] Filed: Sep. 1, 1994

[51] Int. Cl.⁶ .................... H01S 3/00; G02B 6/30
[52] U.S. Cl. ................... 372/6; 385/49; 385/88; 257/40
[58] Field of Search .................. 372/6; 385/49, 385/88, 89, 92; 257/40, 79, 80, 116; 313/504, 505–509; 428/690

[56] References Cited

U.S. PATENT DOCUMENTS

| | | | |
|---|---|---|---|
| 4,130,343 | 12/1978 | Miller et al. | 385/49 |
| 4,326,771 | 4/1982 | Henry et al. | 385/92 |
| 4,466,696 | 8/1984 | Carney | 385/49 |
| 4,577,209 | 3/1986 | Forrest et al. | 357/30 |
| 4,581,744 | 4/1986 | Takamiya et al. | 372/92 |
| 4,826,272 | 5/1989 | Pimpinella et al. | 385/92 |
| 4,946,242 | 8/1990 | Tanno et al. | 385/88 |
| 4,948,960 | 8/1990 | Simms et al. | 357/19 |
| 5,097,299 | 3/1992 | Donhowe et al. | 357/19 |
| 5,317,169 | 5/1994 | Nakano et al. | 257/40 |
| 5,331,182 | 7/1994 | Takimoto et al. | 257/40 |
| 5,405,710 | 4/1995 | Dodabalapur et al. | 428/690 |
| 5,429,884 | 7/1995 | Namiki et al. | 428/690 |
| 5,434,939 | 7/1995 | Matsuda | 385/88 |

OTHER PUBLICATIONS

C. W. Tang et al., "Organic Electroluminescent Diodes", Appl. Phys. Lett. 51 (12), 21 Sep. 1987, 1987 American Institute of Physics.

M. Ishiko et al., Matrix–Addressed Organic Thin Film EL Display Panel, JAPAN DISPLAY '89, pp. 704–707.

Primary Examiner—Rodney B. Bovernick
Assistant Examiner—Hemang Sanghavi
Attorney, Agent, or Firm—Gary F. Witting; Eugene A. Parsons

[57] ABSTRACT

An article and method for making an integrated light emitting optical fiber (101) is provided. The optical fiber (101) having an optical surface (106) and an external surface (105) is provided. A first conductive layer (109) is disposed on the optical fiber (101). A light emitting layer (115) is disposed on a portion of the optical surface (106) of the optical fiber (101) and a second conductive layer (121) is disposed on the light emitting layer (115).

24 Claims, 4 Drawing Sheets

5,546,413

1

INTEGRATED LIGHT EMITTING DEVICE

BACKGROUND OF THE INVENTION

This invention relates, in general, to optoelectronic devices and, in particular, to electroluminescent devices.

Conventionally, organic electroluminescent devices or diodes have been fabricated on flat planar substrates. The organic electroluminescent devices typically are made by applying a first transparent conductive layer such as indium tin oxide on an optically clear substrate such as glass. An organic light emitting polymer is then applied to the first transparent conductive layer, thereby making an organic light emitting polymer layer located on the first transparent conductive layer. A second conductive layer such as gold is then applied to the organic light emitting polymer layer, thereby locating the organic light emitting polymer layer between the first transparent conductive layer and the second conductive layer. Thus, when a voltage of suitable value is applied between the first transparent conductive layer and the second conductive layer, the light emitting polymer is electrically excited to emit light that passes from the light emitting polymer through the glass substrate to the observer.

However, conventional fabrication of electroluminescent devices requires planar substrates, thereby presenting severe limitations and problems, such as rigidity of design and fabrication, and the like. Further, because of these problems, integration of electroluminescent devices with other optical elements is severely curtailed, thus limiting use of electroluminescent devices in high volume manufacturing.

It can be readily seen that conventional articles and conventional methods for manufacturing electroluminescent devices have severe limitations. Also, it is evident that conventional fabrication methods and articles of electroluminescent devices are not effectively integrated with other optical elements. Moreover, since conventional methods and articles do not lend themselves to integration with other optical elements, manufacturing of electroluminescent devices is limited or severely curtailed. Moreover, use of electroluminescent devices is also curtailed since these devices are not manufactured in high volume. Therefore, a method and structure for making an integrated light emitting optical fiber would be highly desirable.

SUMMARY OF THE INVENTION

Briefly stated, an article and method of making an integrated light emitting optical fiber are provided. An optical fiber having an optical surface thereon is provided. A first contact is disposed on a portion of the optical surface of the optical fiber. An organic light emitting polymer is disposed on a portion of the first contact on the optical fiber. A second contact is located on a portion of the organic light emitting fiber, thereby forming an integrated light emitting optical fiber.

2

DETAILED DESCRIPTION OF THE DRAWINGS

Figure 1:
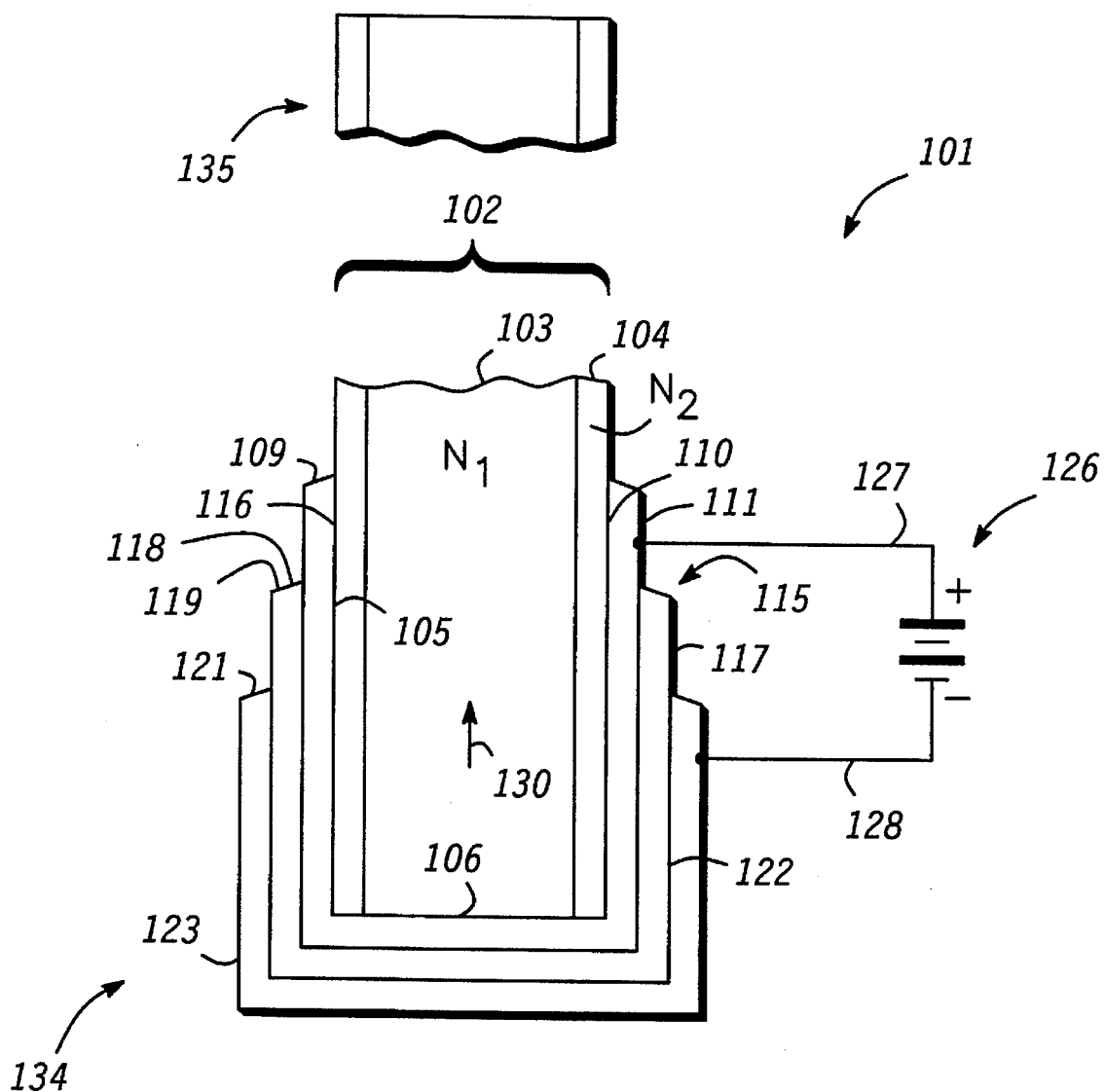
FIGS. 1–3 are a greatly enlarged simplified sectional views of embodiments of integrated light emitting optical fibers.
Figure 2:
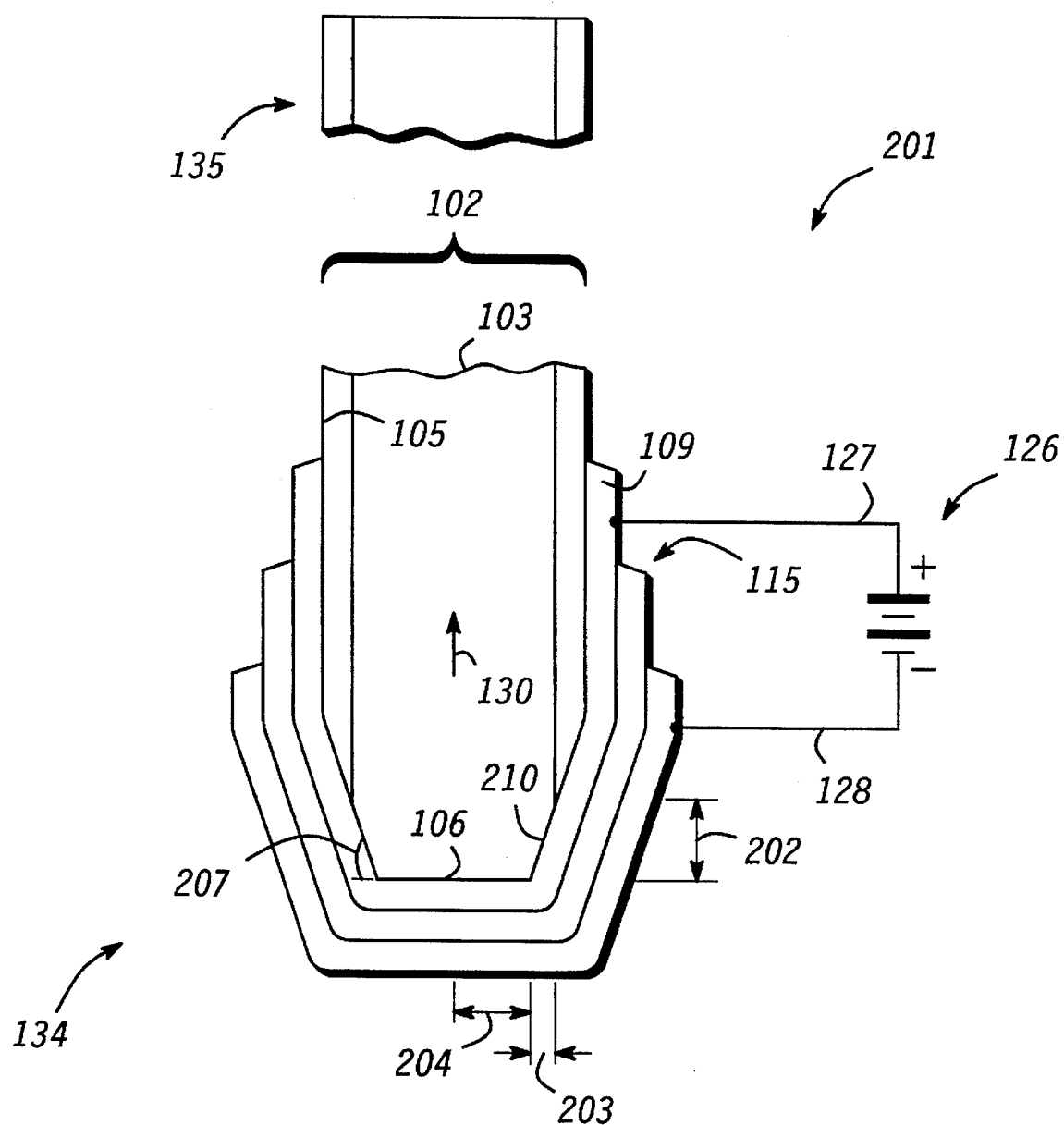
Figure 3:
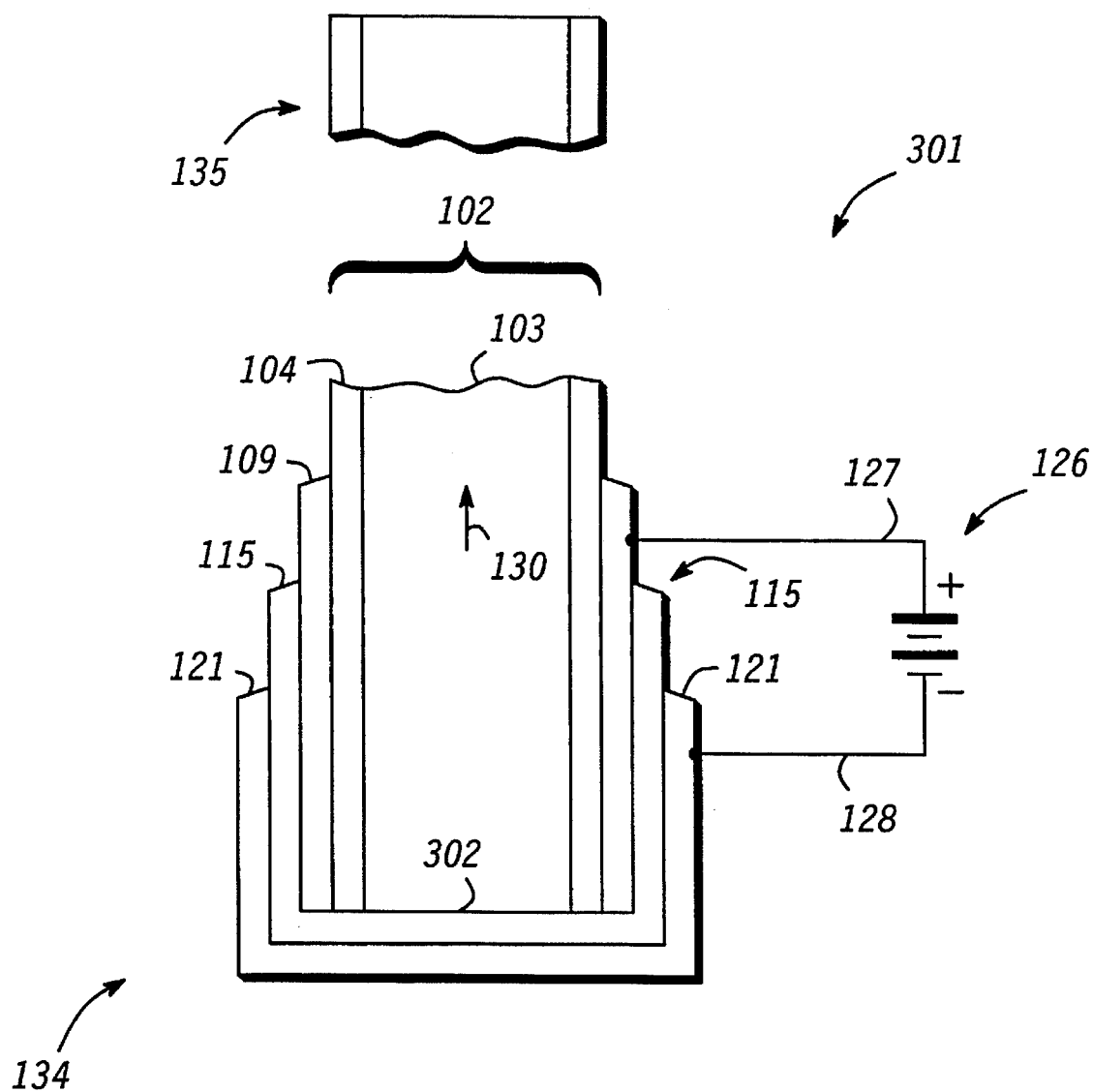

FIGS. 1–3 illustrate greatly enlarged simplified sectional views of integrated light emitting optical fibers 101, 201, and 301 being operably coupled to a voltage source 126. Integrated light emitting optical fibers 101, 201, and 301 are made with several elements or features, such as an optical fiber 102 having a first end 134 and a second end 135, a core region 103, a cladding region 104 with an external surface 105, and an optical surface 106, a first contact or a first conductive layer 109 having surfaces 110 and 111, a light emitting layer 115 having surfaces 116 and 117, a second contact or a second conductive layer 121 having surfaces 122 and 123, and voltage source 126 having leads 127 and 128. It should be understood that integrated light emitting optical fibers 101, 201, and 301 are illustrated in section views, thus integrated light emitting optical fibers 101, 201, and 301 extend into and out of the figures. Further, so as to more clearly illustrate the present invention, it should be understood that no attempt has been made to illustrate actual sizes or relative sizes of elements or features found herein.

Generally, optical fiber 102 is made of any suitable material or combination of materials such as glass, plastic, or the like that provide appropriate optical characteristics. Thus, a large number of materials, as well as a large combination of materials is able to be selected from to suit specific applications and needs. Optical fiber 102 includes core region 103 and cladding region 104 each having a specific refractive index that is identified as $n_1$ and $n_2$, respectively. Typically, refractive indexes $n_1$ and $n_2$ of materials used for core region 103 and cladding region 104, respectively, are selected so that refractive index $n_1$ of core region 103 is higher than refractive index $n_2$ of cladding region 104, thereby providing appropriate optical characteristics for effective and efficient guiding of an optical signal or a light, illustrated by arrow 130, through core region 103 of optical fiber 102. Further, as shown in FIG. 1, optical fiber 102 is made having optical surface 106, thereby providing an entrance or an optical port for light or optical signals emitted from light emitting layer 115 that enters core region 103 of optical fiber 102.

First conductive layer 109 is made of any suitable conductive material, such as conductive polymers, metals, alloys, or the like. However, in the embodiments of the present invention shown in FIGS. 1 and 2, first conductive layer 109 is transparent to a wavelength of light emitted from light emitting layer 115, thereby allowing the light emitted from light emitting layer 115 to enter core region 103 of optical fiber 102.

With reference to FIG. 1, the light or the optical signal emitted from light emitting layer 115 passes through first conductive layer 109, as well as optical surface 106 and enters core region 103 as light or optical signal 130. With reference to FIG. 2, the light or the optical signal emitting from light emitting layer 115 passes through first conductive layer 109, as well as through both optical surface 106 and tapered optical surface 210 and enters core region 103 as light or optical signal 130. By way of example only and with reference to FIGS. 1 and 2, if the wavelength of emitted light from light emitting layer 115 is in the visible spectrum, an indium tin oxide (ITO) material can be used for first conductive layer 109 since ITO is transparent in the visible spectrum.

However, with reference to FIG. 3, since light emitting layer 115 is in direct contact with optical surface 106 of optical fiber 102, the light or the optical signal from light emitting layer 115 passes directly through optical surface 106 and into core region 103 as light or optical signal 130, thus first conductive layer 109 need not be transparent.

Application of first conductive layer 109 is achieved by any suitable method or technique, such as sputtering, chemical vapor deposition (CVD), evaporation, coating, or the like that are well known in the art. It should be understood by one of ordinary skill in the art that selection of specific application method or technique is dependent upon selection of the materials used for making first conductive layer 109 and the materials used for making optical fiber 102. By way of example only, with optical fiber 102 being glass, a sputtering process is used to apply the ITO material on external surface 105 and optical surface 106 of optical fiber 102, thereby generating first conductive layer 109. Typically, process parameters used for pressure, temperature, and power range from $1\times10^{-5}$ to $1\times10^{-6}$ torr, 400 to 800.0 degrees Celsius, and 10.0 to 500.0 watts per square centimeter, respectively.

Light emitting layer 115 is made of any suitable material. Typically, light emitting layer 115 is made of an organic light emitting polymer material, such as anthracene, 8-hydroxyquinoline aluminum ($Alq_3$), or the like that emits light upon application of a voltage, a current, or both. Since different organic materials emit light at different wavelengths or frequencies, selection of different materials can produce primary colors, i.e., red, blue, and green, thereby enabling colors to be mixed to produce any desired color such as white light or any hue thereof.

While light emitting layer 115 being made of the organic light emitting polymer can be a single layer, organic light emitting polymer typically is made as a two material layer or carrier transport layer that includes a hole or an electron transport layer 118 and an emissive layer 119, as illustrated in FIG. 1. Emissive layer 119 is made of similar materials as the organic light emitting polymer. Hole transport layer 118 is made of any suitable material, such as diamine, phthalocyanine, $Alq_3$, oxadiazole or the like. Hole transport layer 118 improves the efficiency of the injection of holes and electrons from first conductive layer 109 to the organic light emitting polymer, thus increasing the amount of emitted light from emissive layer 119.

Fabrication of the organic light emitting polymer, hole transport layer 118, and emissive layer 119 on first conductive layer 109 is achieved by any suitable method, such as evaporation, sputtering, spraying, or the like. However, in a preferred embodiment of the present invention, application of the organic light emitting polymer, hole transport layer 118, and emissive layer 119 are achieved by the evaporation method. More specifically, a vacuum thermal evaporation method is used. Since the organic light emitting polymer materials, the hole transport layer 118 materials, and the emissive layer 119 materials are volatile, low temperatures and low pressures are used for the vacuum thermal evaporation process. Generally, temperatures ranging below 150 degrees Celsius and pressures ranging from $1\times10^{-5}$ to $1\times10^{-6}$ torr, are used. However, a preferred temperature range from 22 to 130 degrees Celsius and a preferred pressure range $0.8\times10^{-5}$ to $0.8\times10^{-6}$ torr, are used. Generally, thicknesses used for the organic light emitting polymer, hole transport layer 118, and emissive layer 119 range from 20 to 400 nanometers with a preferred range from 45 to 360 nanometers. However, it should be understood that specific thicknesses used in the present invention vary depending upon selected materials and specific application methods.

Second conductive layer 121 is made of any suitable conductive material. Conductive materials, such as manganese (Mn), indium (In), silver (Ag), aluminum (Al), copper (Cu), gold (Au), tin (Sn), and the like are used, as well as any suitable low work function conductive materials, such as lithium (Li), magnesium (Mg), calcium (Ca), sodium (Na), or the like. Additionally, alloys and mixtures of the above mentioned conductive material can be used for second conductive layer 121. These materials are applied to light emitting layer 115 by any suitable method, such as evaporation, sputtering, or the like. Additionally, second conductive layer 121 can have any suitable thickness; however, thicknesses for second conductive layer 121 generally range from 100 to 300 nanometers with a preferred thickness ranging from 125 to 175 nanometers having a preferred thickness of 150 nanometers.

Referring now specifically to FIG. 2, integrated light emitting optical fiber 201 is similar to integrated light emitting optical fiber 101 of FIG. 1 except for tapered optical surface 210 that concentrically surrounds optical surface 106. By tapering a portion of core region 103 adjacent to optical surface 106, an increase in total surface area capable of accepting light is realized. This increased surface area can be calculated by using the following formulas:

$$LA = \pi l (r_1 + r_2)$$

where LA is the lateral surface area of a truncated cone, where $\pi$ is a constant, l is distance 202, $r_1$ is distance 203, and $r_2$ is distance 204. Additionally, in order to calculate total surface area of both tapered optical surface 210 and optical surface 106, the surface area of optical surface 106 is added to the surface area of tapered optical surface 210. The surface area of optical surface 106 is calculated with the following formula:

$$A = \pi r^2$$

where A equals surface area of a circle, where $\pi$ is a constant, and where r is equal to distance 204. While total surface areas of tapered optical surface 210 and optical surface 106 can vary in accordance to changing angle 207, an increase in total surface area ranging from 10 to 20 percent can be achieved, thus allowing more of the light emitted from light emitting layer 115 to pass through tapered optical surface 210 and optical surface 106 into core region 103 of optical fiber 102.

Referring now specifically to FIG. 3, first conductive layer 109 has been generally described with reference to FIG. 1. However, in this embodiment of the present invention, first conductive layer 109 can be optically opaque, thereby enabling conductive materials, such as metals, e.g., magnesium, calcium, sodium, gold, silver, aluminum, copper, or the like, to be deposited or applied on external surface 105 of optical fiber 102. Further, any suitable conductive material made in combination is also usable. Moreover, since first conductive layer 109 can be opaque a greater thickness can also be applied, thus enabling larger voltages to be applied to first conductive layer 109 so as to generate greater illumination or emission from light emitting layer 115.

Application of first conductive layer 109 to external surface 105 of optical fiber 102 is achieved with similar methods and techniques described hereinabove. However, in the present embodiment illustrated in FIG. 3, after the application of first conductive layer 109, optical fiber 102 having first conductive layer 109 applied to external surface 105 and optical surface 106 is cut or cleaved to remove a portion of first conductive layer 109 and optical surface 106 so as to generate optical surface 302. By removing a portion of first conductive layer 109 and optical surface 106, a fresh optically clear optical surface 302 is formed even though first conductive layer 109 is opaque.

Light emitting layer 115 is subsequently applied to surface 111 of first conductive layer 109 and to optical surface 302 of optical fiber 102 as previously described with reference to FIG. 1. Since light emitting layer 115 is in direct contact with optical surface 302, light emitted from light emitting layer 115 does not have to go through any other layer or barrier in order to enter core region 103 of optical fiber 102, thereby enhancing the amount of light transferred from light emitting layer 115 into core region 103 of optical fiber 102.

Second conductive layer 121 has been previously described with reference to FIG. 1 thus need not be further described.

In function, with reference to FIG. 1, with optical fiber 102 having optical surface 106, with first conductive layer 109 being applied to external surface 105 and optical surface 106 of optical fiber 102, light emitting layer 115 being applied to a portion of surface 111 of first conductive layer 109, with second conductive layer 121 being applied to a portion of surface 117 of light emitting layer 115, and with voltage source 126 being operably coupled to first conductive layer 109 and to second conductive layer 121 by electrical leads 127 and 128, respectively, integrated light emitting optical fiber 101 emits light from light emitting layer 115 through optical surface 106. Thus, the light emitted from light emitting layer 115 enters through optical surface 106 and is guided through core region 103 of optical fiber 102 to second end 135 of optical fiber 102.

In function, with reference to FIG. 2, with optical fiber 102 having optical surface 106 and tapered optical surface 210, with first conductive layer 109 being applied to external surface 105 and optical surface 106 and tapered optical surface 210 of optical fiber 102, light emitting layer 115 being applied to a portion of first conductive layer 109, with second conductive layer 121 being applied to a portion of light emitting layer 115, and with voltage source 126 being operably coupled to first conductor layer 109 and to second conductive layer 121 by electrical leads 127 and 128, respectively, integrated light emitting optical fiber 101 emits light from light emitting layer 115 through optical surface 106 and tapered optical surface 210. Thus, the light emitted from light emitting layer 115 enters through optical surface 106 and tapered optical surface 210 and is guided through core region 103 of optical fiber to second end 135 of optical fiber 102.

In function, with reference to FIG. 3, with optical fiber 102 having optical surface 106, with first conductive layer 109 being applied to external surface 105 of optical fiber 102, light emitting layer 115 being applied to a portion of first conductive layer 109 and to optical surface 106, with second conductive layer 121 being applied to a portion of light emitting layer 115, and with voltage source 126 being operably coupled to first conductor layer 109 and to second conductive layer 121 by electrical leads 127 and 128, respectively, integrated light emitting optical fiber 101 emits light from light emitting layer 115 directly through optical surface 106. Thus, the light emitted from light emitting layer 115 enters directly through optical surface 106 and is guided through core region 103 of optical fiber to second end 135 of optical fiber 102.

Figure 4:
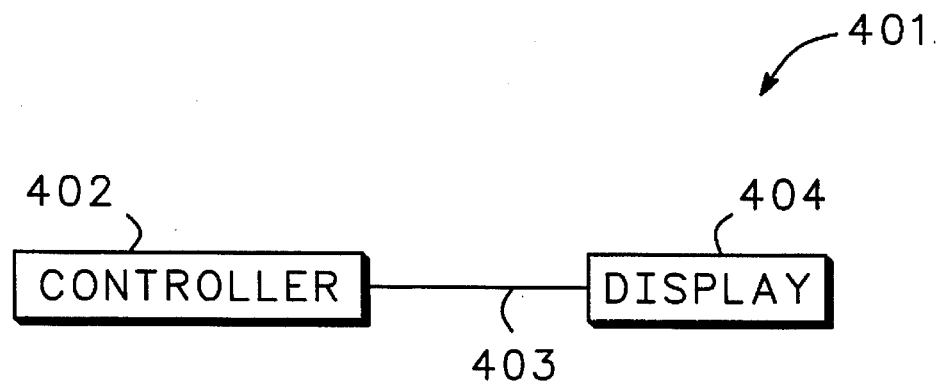
FIG. 4 is a greatly enlarged pictorial illustration of a display configuration using an embodiment of an integrated light emitting optical fiber.

FIG. 4 is a simplified pictorial illustration of a display system 401 using integrated light emitting optical fibers 101, 201, or of FIGS. 1, 2, and 3 301. Display system 401 includes several main elements, such as controller 402, cable 403, and display 404. Generally, controller 402 is a device such as a microprocessing unit (MPU), video controlling device (VDU), or the like that takes signals or images and converts them into an x-y array formatted signal. This x-y formatted signal is then sent to display 404 through cable 403.

Cable 403 is made either of an electrical cable or an optical cable, thus enabling signals from controller 403 to be either optical in nature or electrical in nature. With cable 403 being electrical in nature, electrical signals from controller 402 are sent along cable 403 to display 404. Once the electrical signals are at display 404, the signals are appropriately dispersed to an array of integrated optical fibers (shown in FIG. 5) thereby creating areas of light and darkness, so as to generate an image. Alternatively, with cable 403 being an optical cable, controller 402 manipulates the incoming electrical signal to an x-y electrical array. The electrical signals are then inputted into an array of integrated optical fibers (shown in FIG. 5) that are arranged in a suitable x-y array or grid and are electrically stimulated appropriately by the electrical signals so as to emit light at the appropriate points in the array of integrated optical fibers. As the array of integrated optical fibers emits light, the emitted light travels along cable 403 and to display 404. Display 404 allows the user to visualize emitted light from the array of integrated optical fibers from their second end 135 shown in FIGS. 1–3.

Figure 5:
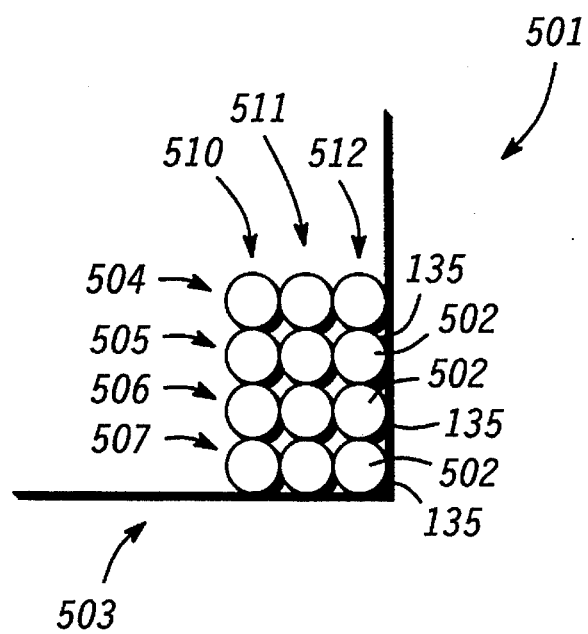
FIG. 5 is a greatly enlarged portion of the display illustrated in FIG. 4.

FIG. 5 is an enlarged portion of display 404 illustrating an x-y array of second ends 135 of a plurality of integrated light emitting optical fibers 503 having optical surfaces 502. A plurality of integrated light emitting optical fibers 503 are arranged in rows 504–507 and columns 510–512, thereby enabling emitted light from light emitting layer 115, shown in FIGS. 1–3, to be displayed and seen by the observer from optical surfaces 502 of second ends 135 of the plurality of integrated light emitting optical fibers 503. Also, it should be noted that selecting appropriate materials for fabricating light emitting layer 115 shown in FIGS. 1–3 provides primary colors such as, green, red, and blue, thereby enabling pixels of three second ends 135 of the plurality of integrated light emitting optical fibers 503 to emit desired colors so that a viewer sees a color image when viewing display 404 as a whole.

By now it should be appreciated that there has been provided an article and a novel method for making an integrated light emitting fiber and display utilizing same. Integrated light emitting optical fibers can be utilized so as to make a display. Also, integrated light emitting optical fibers provide self alignment feature so that alignment to a stand alone LED is not necessary. Further, use of opaque metal material capable of being utilized so as to drive the organic light emitting layer with more voltage, thus producing a more robust and brighter illuminescence.

We claim:

1. An integrated light emitting device and optical fiber comprising:

an optical fiber having an external surface including an end surface and a side surface adjacent to the end surface, the end surface defining an optical surface for light input/output;

a first conductive layer formed on the external surface of the optical fiber including at least the side surface;

a light emitting layer formed on the first conductive layer of the optical fiber, the first conductive layer and light emitting layer being positioned so that a portion of the light emitting layer overlies the optical surface; and a second conductive layer formed on the light emitting layer.

2. An integrated light emitting optical fiber as claimed claim 1 wherein the first conductive layer is optically clear.

3. An integrated light emitting optical fiber as claimed in claim 1 wherein the first conductive layer is indium titanium oxide.

4. An integrated light emitting optical fiber as claimed in claim 1 wherein the first conductive layer is a conductive polymer.

5. An integrated light emitting optical fiber as claimed in claim 1 wherein the conductive polymer is selected from a group including epoxies, polyimides, and plastics.

6. An integrated light emitting optical fiber as claimed in claim 1 wherein the optical fiber further includes a tapered second surface that surrounds the optical surface.

7. An integrated light emitting optical fiber as claimed in claim 1 wherein the light emitting layer further includes an emission layer and a hole transport layer.

8. An integrated light emitting optical fiber as claimed in claim 7 wherein the hole transport layer is selected from a group including diamines, phthalocyanines, and oxadiazoles.

9. An integrated light emitting optical fiber as claimed in claim 7 wherein the emission layer is tris(8-hydroxyquinoline)aluminum ($Alq_3$).

10. An integrated light emitting optical fiber as claimed in claim 1 further including a voltage source operably coupled to the first conductive layer and the second conductive layer.

11. An integrated optical fiber display comprising:
    a plurality of optical fibers with each optical fiber of the plurality of optical fibers having a core region, a cladding region, a first end, and a second end, the core region of the first end of each of the plurality of optical fibers having a first optical surface, the cladding region of each of the plurality of optical fibers surrounds each core region of the plurality of optical fibers and generates an external surface including a side surface;
    a plurality of first contacts with each first contact including a conductive layer disposed on a portion of the external surface including the side surface adjacent the optical surface of the first end of separate optical fiber of the plurality of optical fibers;
    a plurality of light emitting layers, each light emitting layer being disposed on a separate one of the contact layers and in overlying relationship to the adjacent optical surface;
    a plurality of second contacts with each second contact including a conductive layer disposed on a separate one of the plurality of light emitting layers; and
    the second end of the each optical fiber of the plurality of optical fibers having a second optical surface, the second optical surface of the each optical fiber of the plurality of optical fibers arranged in an array of rows and columns.

12. An integrated optical fiber display as claimed in claim 11 wherein the plurality of optical fibers having first ends are arranged in an array having rows and columns.

13. An integrated optical fiber display as claimed in claim 11 wherein the plurality of first contacts are optically clear.

14. An integrated optical fiber display as claimed in claim 13 wherein the plurality of first contacts are indium titanium oxide.

15. An integrated optical fiber display as claimed in claim 11 wherein the plurality of light emitting layers are made from a conductive polymer.

16. An integrated optical fiber display as claimed in claim 15 wherein the conductive polymer is selected from a group including epoxies, polyimides, and plastics.

17. An integrated optical fiber display as claimed in claim 11 wherein the optical fiber further includes a second optical surface, the second optical surface is tapered and concentrically located around the first optical surface.

18. An integrated optical fiber display as claimed in claim 11 wherein the organic light emitting polymer further includes an emission layer and a carrier transport layer.

19. An integrated optical fiber display as claimed in claim 18 wherein the carrier transport layer includes a hole transport layer selected from a group including diamines, phthalocyanines, and oxadiazoles.

20. An integrated optical fiber display as claimed in claim 11 wherein the emission layer is tris(8-hydroxyquinoline)aluminum ($Alq_3$).

21. A method for making an integrated light emitting device and optical fiber comprising the steps of:
    providing an optical fiber having an external surface including an end surface and a side surface adjacent to the end surface, external surface including an optical surface for light input/output;
    forming a first conductive layer on a portion of the external surface including the side surface of the optical fiber;
    forming a light emitting layer on a portion of the first conductive layer and, in overlying relationship to a portion of the optical surface of the optical fiber; and
    forming a second conductive layer on a portion of the light emitting layer.

22. A method for making an integrated light emitting device and optical fiber as claimed in claim 21 where in the step of forming a first conductive layer, the first conductive layer is formed by sputtering.

23. A method for making an integrated light emitting device and optical fiber as claimed in claim 21 where in the step of forming a light emitting layer, the light emitting layer is formed by evaporation.

24. A method for making an integrated light emitting device and optical fiber comprising:
    providing an optical fiber having an external surface including an end surface and a side surface adjacent to the end surface, the external surface including an optical surface for light input/output;
    forming a first contact on the optical surface and the external surface including the side surface of the optical fiber;
    cleaving a portion of the first contact of the optical fiber forming a second optical surface;
    forming an organic light emitting polymer on a portion of the first contact and on a portion of the second optical surface of the optical fiber; and
    forming a second contact on the organic light emitting polymer.

* * * * *

UNITED STATES PATENT AND TRADEMARK OFFICE
CERTIFICATE OF CORRECTION

PATENT NO. : 5,546,413
DATED : August 13, 1996
INVENTOR(S) : Michael S. Lebby
Christopher Ky Chun
Gary F. Witting It is certified that error appears in the above-indentified patent and that said Letters Patent is hereby corrected as shown below:

Claim 5, column 7, line 10
Delete "1" and insert --4-- therefor.

Claim 21, column 8, line 25
Insert --the-- before "external" therefor.

Claim 22, column 8, line 36
Insert --,-- after "where" therefor.

Claim 23, column 8, line 40
Insert --,-- after "where" therefor.

Signed and Sealed this

Sixteenth Day of September, 1997

Attest:

BRUCE LEHMAN

*Attesting Officer*     *Commissioner of Patents and Trademarks*